(12) United States Patent
Park et al.

(10) Patent No.: US 11,406,942 B2
(45) Date of Patent: Aug. 9, 2022

(54) HOLLOW FIBER MEMBRANE AND MANUFACTURING METHOD THEREOF

(71) Applicant: LOTTE CHEMICAL CORPORATION, Seoul (KR)

(72) Inventors: Bum Jin Park, Daejeon (KR); Dong Jun Im, Daejeon (KR); Chang Min Seo, Daejeon (KR)

(73) Assignee: LOTTE CHEMICAL CORPORATION, Seoul (KR)

(*) Notice: Subject to any disclaimer, the term of this patent is extended or adjusted under 35 U.S.C. 154(b) by 154 days.

(21) Appl. No.: 16/766,656

(22) PCT Filed: Nov. 22, 2018

(86) PCT No.: PCT/KR2018/014428
§ 371 (c)(1),
(2) Date: May 22, 2020

(87) PCT Pub. No.: WO2019/103481
PCT Pub. Date: May 31, 2019

(65) Prior Publication Data
US 2020/0360864 A1 Nov. 19, 2020

(30) Foreign Application Priority Data

Nov. 24, 2017 (KR) ........................ 10-2017-0158868

(51) Int. Cl.
*B01D 69/08* (2006.01)
*B01D 69/02* (2006.01)
*B01D 71/34* (2006.01)

(52) U.S. Cl.
CPC ........... *B01D 69/087* (2013.01); *B01D 69/02* (2013.01); *B01D 71/34* (2013.01);
(Continued)

(58) Field of Classification Search
CPC ............ B01D 67/0023; B01D 67/0025; B01D 67/0027; B01D 67/0003; B01D 2323/20;
(Continued)

(56) References Cited

U.S. PATENT DOCUMENTS

| 10,471,395 B2 * | 11/2019 | Im ........................ B01D 69/081 |
| 2003/0107150 A1 | 6/2003 | Hamanaka et al. |
| 2008/0078718 A1 * | 4/2008 | Tada ...................... B01D 69/02 427/244 |

FOREIGN PATENT DOCUMENTS

| CA | 2322855 A1 * | 9/1999 |
| JP | 4781691 B2 | 9/2011 |

(Continued)

OTHER PUBLICATIONS

Extended European Search Report from corresponding European Application No. 18880972.7, Extended European Search Report dated Jul. 22, 2021 (4 pgs.).

*Primary Examiner* — Ryan B Huang
(74) *Attorney, Agent, or Firm* — Lewis Roca Rothgerber Christie LLP

(57) ABSTRACT

A hollow fiber membrane of the present invention is a hollow fiber membrane having an outer surface and an inner surface, wherein the inner surface has a zebra stripe pattern in which dense portions and porous portions are alternately formed in the longitudinal direction, and the outer surface has a maximum pore size of about 1 μm or less (≤about 1 μm), and wherein the hollow fiber membrane has a water permeability (flux) of ≥about 1,300 LMH/bar to ≤about 5,000 LMH/bar.

14 Claims, 2 Drawing Sheets

(52) U.S. Cl.
CPC .... *B01D 2325/023* (2013.01); *B01D 2325/20* (2013.01); *B01D 2325/24* (2013.01); *B01D 2325/36* (2013.01); *B01D 2325/38* (2013.01)

(58) Field of Classification Search
CPC .......... B01D 2325/022; B01D 67/0018; B01D 67/0083; B01D 67/0086; B01D 69/087; B01D 69/088
See application file for complete search history.

(56) References Cited

FOREIGN PATENT DOCUMENTS

| | | |
|---|---|---|
| JP | 5549768 B2 | 7/2014 |
| KR | 10-2003-0001474 A | 1/2003 |
| KR | 10-2006-0134157 A | 12/2006 |
| KR | 10-2012-0024965 A | 3/2012 |
| KR | 10-2014-0042261 A | 4/2014 |
| KR | 10-2016-0081612 A | 7/2016 |

* cited by examiner

[FIG. 1]
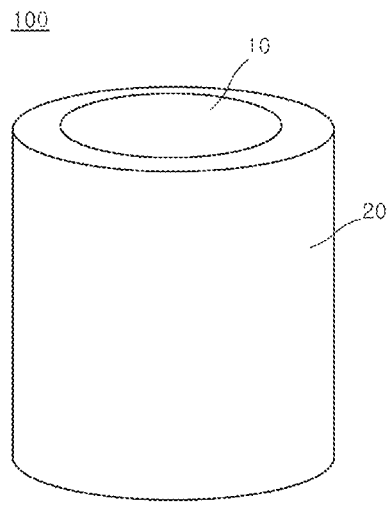
[FIG. 2]
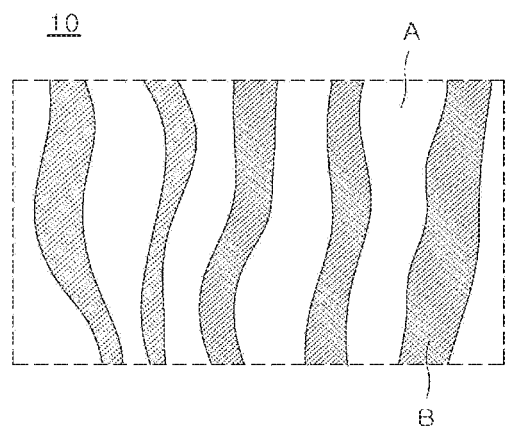
[FIG. 3A]
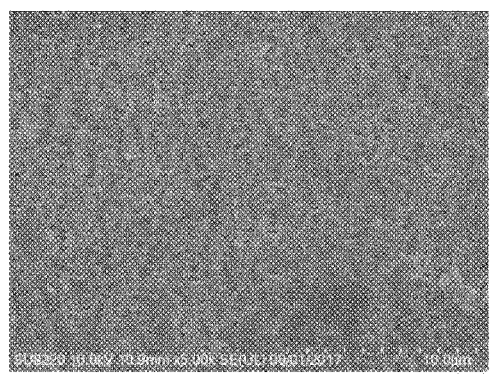

[FIG. 3B]
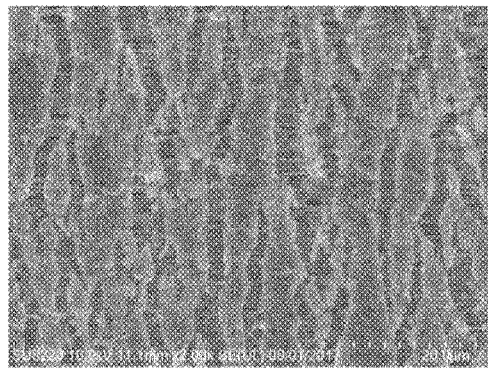
[FIG. 4A]
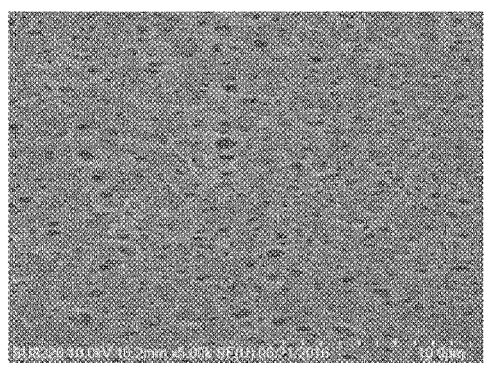
[FIG. 4B]
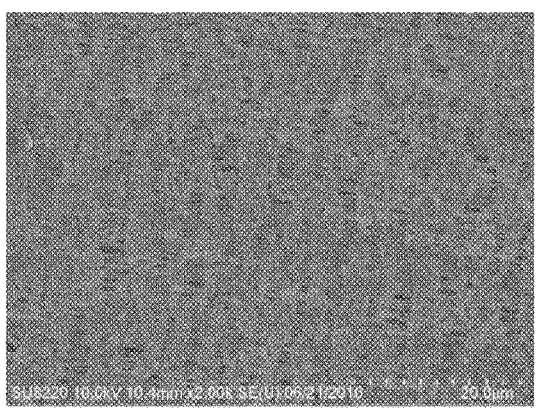

HOLLOW FIBER MEMBRANE AND MANUFACTURING METHOD THEREOF

CROSS-REFERENCE TO RELATED APPLICATIONS

This application is a U.S. National Phase Patent Application of International Application Number PCT/KR2018/014428, filed on Nov. 22, 2018, which claims priority to Korean Patent Application Number 10-2017-0158868, filed on Nov. 24, 2017, the entire contents of both of which are incorporated herein by reference.

TECHNICAL FIELD

The present invention relates to a hollow fiber membrane and a method of manufacturing the same. More particularly, the present invention relates to a hollow fiber membrane that has good water permeability and mechanical strength through adjustment of pore size on inner and outer surfaces thereof, and a method of manufacturing the same.

BACKGROUND ART

Methods for manufacturing a polyvinylidene fluoride (PVDF) based hollow fiber membrane can be generally classified into a thermally induced phase separation (TIPS) method and a non-solvent induced phase separation (NIPS) method. Despite advantages of an asymmetrical structure and fine pores, a hollow fiber membrane manufactured by the NIPS method has a problem of insufficient mechanical strength. On the other hand, although the TIPS method can realize high strength by phase transition through rapid cooling, a hollow fiber membrane manufactured by the TIPS method has poor water permeability due to a dense layer formed on an outer surface thereof.

Recently, various attempts, for example, adjustment of spinning conditions, addition of additives, and the like, have been made in order to improve water permeability of the hollow fiber membrane manufactured by the TIPS method.

In order to improve water permeability of the hollow fiber membrane through adjustment of the spinning conditions, there is a method of reducing an air gap exposed to an atmosphere before a spinning solution is immersed in a coagulation bath. Generally, when a polymer spinning solution is exposed to an atmosphere, a solvent or a diluent is volatilized from the outer surface of the hollow fiber membrane and a dense polymer layer is formed on the outer surface of the hollow fiber membrane upon dipping the hollow fiber membrane into the coagulation bath, thereby deteriorating water permeability. Although reduction in time for exposure of the air gap can slightly increase water permeability of the hollow fiber membrane, there is a problem of deterioration in mechanical strength and stability in formation of the hollow fiber membrane.

In another method for improving water permeability, a diluent or a good solvent having a small difference in solubility parameter with PVDF is mixed in the coagulation bath. However, the use of the diluent or the good solvent causes deterioration in mechanical strength of the hollow fiber membrane due to formation of a porous structure on the outer surface thereof during solidification, despite further improvement in water permeability than the use of a non-solvent, such as water, which has a large difference in solubility parameter with PVDF.

In a further method for improving water permeability, the hollow fiber membrane is manufactured using inorganic fine-particle additives. Recently, in manufacture of the PVDF hollow fiber membrane through thermally induced phase separation, a phthalate-based plasticizer and the inorganic fine particles (silica) are used to form the hollow fiber membrane having a network inner structure and improved mechanical strength and water permeability. Although the hollow fiber membrane manufactured by this method has good properties, this method requires application of a complicated extraction process in order to achieve complete extraction of silica used as the inorganic fine particle additives. As a result, there are problems of extension in time for manufacturing process and increase in manufacturing costs.

Therefore, there is a need for development of a polyvinylidene fluoride-based hollow fiber membrane that has improved water permeability and mechanical strength and can be manufactured by a simple process.

The background technique of the present invention is disclosed in Korean Patent Publication No. 10-2003-0001474.

DISCLOSURE

Technical Problem

It is one aspect of the present invention to provide a hollow fiber membrane that has good water permeability and mechanical strength, and a method of manufacturing the same.

It is another aspect of the present invention to provide a hollow fiber membrane that can be manufactured by a simple process without application of a complicated extraction process using inorganic fine particles, and a method of manufacturing the same.

It is a further aspect of the present invention to provide a hollow fiber membrane that allows easy control of pore size on an outer surface thereof, and a method of manufacturing the same.

It is yet another aspect of the present invention to provide a hollow fiber membrane that can prevent pore blockage and has good anti-fouling properties, and a method of manufacturing the same.

The above and other aspects of the present invention can be achieved by the present invention described below.

Technical Solution

1. One aspect of the present invention relates to a hollow fiber membrane. The hollow fiber membrane has an outer surface and an inner surface, wherein the inner surface has a zebra stripe pattern having a dense portion and a porous portion alternately formed in a longitudinal direction thereof and the outer surface has a maximum pore size of about 1 μm or less (≤about 1 μm), and wherein the hollow fiber membrane has a water permeability (flux) of ≥about 1,300 LMH/bar to ≤about 5,000 LMH/bar.

2. In Item 1, the hollow fiber membrane may have an average pore diameter of ≥about 0.08 μm to ≤about 0.3 μm and the outer surface of the hollow fiber membrane may have a maximum pore size of ≥about 0.09 μm to ≤about 0.5 μm.

3. In Item 1 or 2, the dense portion of the inner surface may have an average pore diameter of ≥about 0.001 μm to ≤about 0.05 μm and the porous portion of the inner surface may have an average pore diameter of ≥about 0.1 μm to ≤about 0.55 μm.

4. In any one of Items 1 to 3, in an area of about 5 μm² on the inner surface of the hollow fiber membrane, the dense portion may have a maximum pore size of less than about 0.08 μm (<about 0.08 μm) and the porous portion may have at least one (≥about 1) pore having a pore diameter of about 0.1 μm or more (≥about 0.1 μm).

5. In any one of Items 1 to 4, the dense portion and the porous portion may be formed in an apparent area ratio represented by Equation 1:

about 0.25≤apparent area ratio($B/A$)≤about 2.5, [Equation 1]

where B indicates an apparent area of the porous portion and A indicates an apparent area of the dense portion.

6. In any one of Items 1 to 5, a pore size of the hollow fiber membrane may gradually increase from the outer surface thereof to the inner surface thereof.

7. In any one of Items 1 to 6, the hollow fiber membrane may have an elongation at break of ≥about 70% to ≤about 210%.

8. In any one of Items 1 to 7, the hollow fiber membrane may have a network structure.

9. Another aspect of the present invention relates to a method of manufacturing a hollow fiber membrane. The method may include: preparing a spinning solution by using a composition comprising a polyvinylidene fluoride resin, a polyester plasticizer having a viscosity of ≥about 100 cP to ≤about 4,000 cP, a good solvent, and a non-crystalline polymer additive; spinning the spinning solution to a wet-type coagulation bath to form a preliminary hollow fiber membrane; extracting the plasticizer, the good solvent and the non-crystalline polymer additive from the preliminary hollow fiber membrane; crystallizing the preliminary hollow fiber membrane; and cold drawing the crystallized preliminary hollow fiber membrane.

10. In Item 9, the non-crystalline polymer additive may be a hydrophilic non-crystalline polymer additive and may have a solubility parameter difference of about 5 $MPa^{0.5}$ or less (≤about 5 $MPa^{0.5}$) with the polyvinylidene fluoride resin.

11. In Item 9, the non-crystalline polymer additive may be a hydrophobic non-crystalline polymer additive and may have a solubility parameter difference of about 20 $MPa^{0.5}$ or less (≤about 20 $MPa^{0.5}$) with the polyvinylidene fluoride resin.

12. In any one of Items 9 to 11, the wet-type coagulation bath may have a temperature in the range of ≥about 15° C. to ≤about 40° C.

13. In any one of Items 9 to 12, crystallizing may include heat treatment at a temperature of ≥about 80° C. to ≤about 150° C. for ≥about 3 minutes to ≤about 200 minutes.

14. In any one of Items 9 to 13, the composition may include 100 parts by weight of the polyvinylidene fluoride resin, ≥about 1.5 parts by weight to ≤about 2.0 parts by weight of the polyester plasticizer, ≥about 0.2 parts by weight to ≤about 0.5 parts by weight of the good solvent, and ≥about 0.01 parts by weight to ≤about 0.2 parts by weight of the non-crystalline polymer additive.

Advantageous Effects

The present invention provides a hollow fiber membrane that has good water permeability and mechanical strength, can be manufactured by a simple process without application of a complicated extraction process using inorganic fine particles, allows easy control of pore size on an outer surface thereof, and can prevent pore blockage and has good anti-fouling properties, and a method of manufacturing the same.

DESCRIPTION OF DRAWINGS

FIG. 1 is a schematic view of a hollow fiber membrane according to one embodiment of the present invention.

FIG. 2 is a view of an inner surface of the hollow fiber membrane according to the embodiment of the present invention.

FIG. 3A is an SEM image (magnification: 5,000×) of an outer surface of a hollow fiber membrane prepared in Example 1 and FIG. 3B is an SEM image (magnification: 5,000×) of an inner surface of the hollow fiber membrane prepared in Example 1.

FIG. 4A is an SEM image (magnification: 5,000×) of an outer surface of a hollow fiber membrane prepared in Comparative Example 1 and FIG. 4B is an SEM image (magnification: 5,000×) of an inner surface of the hollow fiber membrane prepared in Comparative Example 1.

BEST MODE

Hereinafter, embodiments of the present invention will be described in detail.

Descriptions of known functions and constructions which can unnecessarily obscure the subject matter of the present invention will be omitted.

It will be understood that, as used in this specification, the terms "includes", "comprises", "including" and/or "comprising," do not preclude the presence or addition of one or more other features, steps, operations, elements, components, and/or groups. As used herein, the singular forms, "a," "an," and "the" are intended to include the plural forms as well, unless the context clearly indicates otherwise.

Further, it should be understood that a numerical value related to a certain component is construed to include a tolerance range in interpretation of constituent components, unless clearly stated otherwise.

As used herein to represent a specific numerical range, the expression "X to Y" means a value greater than or equal to X and less than or equal to Y (≥X and ≤Y).

As used herein, the term "apparent area" is used to represent the area of a dense portion and/or a porous portion, and refers to an area of the dense portion in a hollow fiber membrane and/or an area of the porous portion in the hollow fiber membrane, without consideration of pores.

Hollow Fiber Membrane

Now, a hollow fiber membrane according to one embodiment of the present invention will be described with reference to FIG. 1. The hollow fiber membrane 100 has a cylindrical shape and includes an inner surface 10 vertically extending along an inner peripheral surface thereof and an outer surface 20 vertically extending along an outer peripheral surface thereof. When raw water is input to the hollow fiber membrane through the outer surface 20, treated water may be discharged through the inner surface 10, or when raw water is input to the hollow fiber membrane through the inner surface 10, treated water may be discharged through the outer surface 20.

FIG. 2 is a view of an inner surface of the hollow fiber membrane according to the embodiment of the present invention.

Referring to FIG. 2, the inner surface 10 has a zebra stripe pattern including a dense portion A and a porous portion B extending in a longitudinal direction thereof and alternately arranged. It should be understood that FIG. 2 shows one example of the zebra stripe pattern and the present invention is not limited thereto. Specifically, each of the dense portion A and/or the porous portion B alternately arranged may have a band shape extending in the longitudinal direction or a band shape extending in the longitudinal direction and including at least one branch which connects adjacent dense portions A or adjacent porous portions B to each other.

The hollow fiber membrane includes pores formed on the surface thereof to remove contaminants while allowing permeation of purified water therethrough. Although higher porosity of the hollow fiber membrane leads to higher water permeability by allowing more water to pass through the hollow fiber membrane, the hollow fiber membrane has lower strength, causing damage to the hollow fiber membrane or reduction in lifespan thereof upon operation and cleaning of the hollow fiber membrane. Conversely, lower porosity of the hollow fiber membrane leads to higher strength thereof, causing increase in extension of lifespan of the hollow fiber membrane and decrease in water permeability thereof. There is a limit in improvement in water permeability, strength and lifespan of the hollow fiber membrane only through adjustment of porosity and materials of the hollow fiber membrane.

The hollow fiber membrane 100 according to the present invention has a zebra stripe pattern in which the dense portion A and the porous portion B are alternately formed on the inner surface 10 in the longitudinal direction of the hollow fiber membrane, thereby providing good properties in terms of water permeability, strength and lifespan. Specifically, the dense portion A corresponds to a dense region in which the number of pores is minimized and serves to increase mechanical strength of the hollow fiber membrane, and the porous portion B is a region in which a number of pores are formed and serves to improve water permeability.

The hollow fiber membrane may be constituted by a single layer, without being limited thereto.

Specifically, in a surface area of about 5 μm' on the inner surface of the hollow fiber membrane, the dense portion A may have a maximum pore size of less than about 0.08 μm (<about 0.08 μm) (for example, less than 0.08 μm, 0.07 μm or less, less than 0.07 μm, 0.06 μm or less, less than 0.06 μm, 0.05 μm or less, or less than 0.05 μm), and the porous portion B may include one or more (≥about 1) pores (for example, 1 or more, 2 or more, 3 or more, 4 or more, or 5 or more) each having a pore diameter of about 0.1 μm (≥about 0.1 μm) (for example, 0.1 μm or more, greater than 0.1 μm, 0.11 μm or more, greater than 0.11 μm, 0.12 μm or more, greater than 0.12 μm, 0.13 μm or more, greater than 0.13 μm, 0.14 μm or more, greater than 0.14 μm, 0.15 μm or more, or 0.15 μm or more). Within this range, the hollow fiber membrane has good balance between water permeability and strength. Here, the number of pores having a particular diameter can be observed and measured through a scanning electronic microscope.

In the hollow fiber membrane, the dense portion A and the porous portion B may be formed in an apparent area ratio, as represented by Equation 1.

about 0.25≤apparent area ratio(B/A)≤about 2.5, [Equation 1]

where B indicates an apparent area of the porous portion and A indicates an apparent area of the dense portion.

Specifically, the dense portion A and the porous portion B may be formed in an apparent area ratio (B/A) of ≥about 0.25 to ≤about 2.5 (for example, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45 or 2.5), more specifically ≥about 0.4 to ≤about 1.5, still more specifically ≥about 0.5 to ≤about 1. Within this range of apparent area ratio, the hollow fiber membrane has good properties in terms of not only water permeability, but also strength and lifespan.

The porous portion may have an average pore diameter of ≥about 0.1 μm to ≤about 0.55 μm (for example, 0.1 μm, 0.15 μm, 0.2 μm, 0.25 μm, 0.3 μm, 0.35 μm, 0.4 μm, 0.45 μm, 0.5 μm, or 0.55 μm), specifically ≥about 0.15 μm to ≤about 0.40 μm, and the dense portion may have an average pore diameter of about 0.05 μm or less about 0.05 μm) (for example, 0.05 μm or less, less than 0.05 μm, 0.04 μm or less, less than 0.04 μm, 0.03 μm or less, less than 0.03 μm, 0.02 μm or less, less than 0.02 μm, 0.01 μm or less, or less than 0.01 μm), for example, ≥about 0.001 μm to ≤about 0.05 μm, specifically ≥about 0.001 μm to ≤about 0.03 μm. Within this range, the hollow fiber membrane has good water permeability and water treatment efficiency.

The outer surface may have a maximum pore size of about 1 μm or less (≤about 1 μm) (for example, 1 μm or less, less than 1 μm, 0.9 μm or less, less than 0.9 μm, 0.8 μm or less, less than 0.8 μm, 0.7 μm or less, less than 0.7 μm, 0.6 μm or less, less than 0.6 μm, 0.5 μm or less, less than 0.5 μm, 0.4 μm or less, less than 0.4 μm, 0.3 μm or less, less than 0.3 μm, 0.2 μm or less, or less than 0.2 μm), for example, about 0.09 μm to ≤about 0.5 μm, preferably ≥about 0.09 μm to ≤about 0.3 μm. Here, the maximum pore size means a diameter for circular pores or a long diameter for non-circular pores, such as elliptical pores. Within this range, the hollow fiber membrane can secure good water permeability while maintaining mechanical strength and can exhibit good anti-fouling properties by preventing pore blockage.

In the hollow fiber membrane, the pore size may gradually increase from the outer surface to the inner surface. Here, the dense portion of the inner surface may have a smaller pore size than the outer surface.

The hollow fiber membrane may have an elongation at break of ≥about 70% to ≤about 210% (for example, 70%, 80%, 90%, 100%, 110%, 120%, 130%, 140%, 150%, 160%, 170%, 180%, 190%, 200% or 210%), for example, ≥about 75% to ≤about 90%.

The hollow fiber membrane may have a water permeability (flux) of ≥about 1,300 LMH/bar to ≤about 5,000 LMH/bar (for example, 1,300, 1,400, 1,500, 1,600, 1,700, 1,800, 1,900, 2,000, 2,100, 2,200, 2,300, 2,400, 2,480, 2,500, 2,600, 2,700, 2,800, 2,900, 3,000, 3,100, 3,200, 3,300, 3,400, 3,500, 3,600, 3,700, 3,800, 3,900, 4,000, 4,100, 4,200, 4,300, 4,400, 4,500, 4,600, 4,700, 4,800, 4,900 or 5,000 LMH/bar), for example, ≥about 1,500 LMH/bar to ≤about 4,500 LMH/bar, specifically ≥about 1,540 LMH/bar to ≤about 3,200 LMH/bar.

The hollow fiber membrane may have a network structure.

Method of Manufacturing Hollow Fiber Membrane

Another aspect of the present invention relates to a method of manufacturing a hollow fiber membrane. The method may include: preparing a spinning solution by using a composition comprising a polyvinylidene fluoride resin, a polyester plasticizer having a viscosity of ≥about 100 cP to ≤about 4,000 cP, a good solvent, and a non-crystalline polymer additive; spinning the spinning solution to a wet-type coagulation bath to form a preliminary hollow fiber membrane; extracting the plasticizer, the good solvent and the non-crystalline polymer additive from the preliminary hollow fiber membrane; crystallizing the preliminary hollow fiber membrane; and cold drawing the crystallized preliminary hollow fiber membrane.

Hereinafter, each of the steps may be described in detail.

In some embodiments, the method of manufacturing the hollow fiber membrane may include preparing the spinning solution by using the composition comprising the polyvinylidene fluoride resin, the polyester plasticizer having a viscosity of ≥about 100 cP to ≤about 4,000 cP (for example, 100, 200, 300, 400, 500, 600, 700, 800, 900, 1,000, 1,100, 1,200, 1,300, 1,400, 1,500, 1,600, 1,700, 1,800, 1,900, 2,000, 2,100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900, or 4,000 cP), the good solvent, and the non-crystalline polymer additive.

The composition may include 100 parts by weight of the polyvinylidene fluoride resin, ≥about 1.5 to ≤about 2.0 parts by weight (for example, 1.5, 1.6, 1.7, 1.8, 1.86, 1.9, 1.93 or 2.0 parts by weight) of the polyester plasticizer, ≥about 0.2 to ≤about 0.5 parts by weight (for example, 0.2, 0.3, 0.36, 0.4 or 0.5 parts by weight) of the good solvent, and ≥about 0.01 to ≤about 0.2 parts by weight (for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19 or 0.2 parts by weight) of the non-crystalline polymer additive. Within this range, the composition is suitable for formation of the hollow fiber membrane and the hollow fiber membrane formed of the composition has good water permeability and strength.

The polyvinylidene fluoride resin may include at least one selected from the group of a vinylidene fluoride homopolymer and a vinylidene fluoride copolymer. Specifically, the polyvinylidene fluoride resin may include at least one selected from the group of copolymers with ethylene tetrafluoride, propylene hexafluoride, ethylene trifluoride or ethylene trifluoride chloride.

The polyvinylidene fluoride resin may have a weight average molecular weight of ≥about 100,000 to ≤about 1,000,000 (for example, 100,000, 150,000, 200,000, 250,000, 300,000, 450,000, 500,000, 550,000, 600,000, 650,000, 700,000, 750,000, 800,000, 850,000, 900,000, 950,000 or 1,000,000), specifically ≥about 250,000 to ≤about 800,000, more specifically ≥about 300,000 to ≤about 600,000. Within this range, the vinylidene fluoride polymer resin can improve balance between mechanical properties and viscosity.

The polyester plasticizer can dissolve the polyvinylidene fluoride resin at high temperature. The polyester plasticizer may have a viscosity of ≥about 100 cP to ≤about 4,000 cP, for example, ≥about 300 cP to ≤about 4,000 cP, specifically ≥about 1,000 cP to ≤about 3,700 cP, more specifically ≥about 2,000 cP to ≤about 3,500 cP. Within this range, the hollow fiber membrane can have good porosity and mechanical strength.

The polyester plasticizer may be a polyester including repeat units of dicarboxylic acid and a diol. The polyester plasticizer may have a weight average molecular weight of ≥about 500 to ≤about 4,000 (for example, 500, 600, 700, 800, 900, 1,000, 1,100, 1,200, 1,300, 1,400, 1,500, 1,600, 1,700, 1,800, 1,900, 2,000, 2,100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900 or 4,000), specifically ≥about 1,500 to ≤about 3,500. Within this range, the polyester plasticizer can improve porosity and mechanical strength of the hollow fiber membrane.

In some embodiments, the polyester plasticizer may be an adipic acid-based plasticizer, a benzoic acid-based plasticizer, a phthalate-based plasticizer, or a combination thereof.

The good solvent may be selected from any good solvents capable dissolving a polyvinylidene fluoride resin without limitation. For example, the good solvent may include at least one selected from the group of N-mentyl-2-pyrrolidone, dimethyl formamide, N,N'-dimethyl acetamide, dimethyl sulfoxide, and hexamethyl phosphoric triamide.

In one embodiment, the non-crystalline polymer additive may be a hydrophilic non-crystalline polymer additive. The hydrophilic non-crystalline polymer additive may have a solubility parameter difference of about 5 MPa$^{0.5}$ or less (≤about 5 MPa$^{0.5}$) (for example, 5 MPa$^{0.5}$ or less, less than 5 MPa$^{0.5}$, 4.5 MPa$^{0.5}$ or less, less than 4.5 MPa$^{0.5}$, 4 MPa$^{0.5}$ or less, less than 4 MPa$^{0.5}$, 3.5 MPa$^{0.5}$ or less, less than 3.5 MPa$^{0.5}$, 3 MPa$^{0.5}$ or less, less than 3 MPa$^{0.5}$, 2.5 MPa$^{0.5}$ or less, less than 2.5 MPa$^{0.5}$, or 2 MPa$^{0.5}$ or less) with the polyvinylidene fluoride resin. Thus, since the hydrophilic non-crystalline polymer additive has good compatibility with PVDF, the hydrophilic non-crystalline polymer additive can reduce crystallinity of PVDF and a crystal size while increasing a non-crystalline region. The hydrophilic non-crystalline polymer additive may be poly(vinyl pyrrolidone) (PVP), PVP and PVDF have a solubility parameter of 21.2 MPa$^{0.5}$ and a solubility parameter of 19.2 MPa$^{0.5}$, respectively, and have a small difference in solubility parameter with respect to each other, thereby providing good compatibility between PVDF and PVP.

In another embodiment, the non-crystalline polymer additive may be a hydrophobic non-crystalline polymer additive. The polyvinylidene fluoride resin may have a solubility parameter difference of about 20 MPa$^{0.5}$ or less (≤about 20 MPa$^{0.5}$) (for example, 20 MPa$^{0.5}$ or less, less than 20 MPa$^{0.5}$, 15 MPa$^{0.5}$ or less, less than 15 MPa$^{0.5}$, 10 MPa$^{0.5}$ or less, less than 10 MPa$^{0.5}$, 5 MPa$^{0.5}$ or less, less than 5 MPa$^{0.5}$, 3 MPa$^{0.5}$ or less, less than 3 MPa$^{0.5}$, 2 MPa$^{0.5}$ or less, less than 2 MPa$^{0.5}$, 1 MPa$^{0.5}$ or less, less than 1 MPa$^{0.5}$, 0.7 MPa$^{0.5}$ or less, less than 0.7 MPa$^{0.5}$, 0.5 MPa$^{0.5}$ or less, less than 0.5 MPa$^{0.5}$, 0.4 MPa$^{0.5}$ or less, less than 0.4 MPa$^{0.5}$, 0.3 MPa$^{0.5}$ or less, less than 0.3 MPa$^{0.5}$, or 0.2 MPa$^{0.5}$ or less), for example, about 0.5 MPa$^{0.5}$ or less (≤about 0.5 MPa$^{0.5}$), specifically about 0.2 MPa$^{0.5}$ or less (≤about 0.2 MPa$^{0.5}$). The hydrophobic non-crystalline polymer additive may be poly(methyl methacrylate) (PMMA). PMMA and PVDF have a solubility parameter of 19.0 MPa$^{0.5}$ and a solubility parameter of 19.2 MPa$^{0.5}$, respectively, and have a small difference in solubility parameter with respect to each other, thereby providing good compatibility between PVDF and PMMA. PMMA induces structural densification through suppression of crystallization of the polyvinylidene fluoride resin, thereby enabling reduction in pore size on the outer surface and densification of the inner structure (interconnected structure).

By heating the composition to a temperature of ≥about 150° C. to ≤about 250° C. (for example, 150° C., 160° C., 170° C., 180° C., 190° C., 200° C., 210° C., 220° C., 230° C., 240° C. or 250° C.), specifically ≥about 200° C. to ≤about 220° C., the composition becomes a spinning solution that can be used in manufacture of the hollow fiber membrane. Within this range of temperature, the spinning solution can maintain a suitable viscosity for spinning and allows formation of a sufficient number of uniform pores in the hollow fiber membrane. Heating may be performed under a nitrogen atmosphere while stirring for ≥about 2 hours to ≤about 8 hours (for example, 2, 3, 4, 5, 6, 7 or 8 hours), specifically ≥about 2 hours to ≤about 6 hours.

The spinning solution may be subjected to degasification for ≥about 5 minutes to ≤about 30 minutes (for example, for 5, 10, 15, 20, 25 or 30 minutes). After completion of degasification, the spinning solution may be subjected to pressure stabilization by compressing nitrogen for a predetermined period of time.

For spinning the spinning solution through a spinning nozzle, the nozzle may be connected to a line for transferring the spinning solution and may also be connected to a metering pump for pushing the spinning solution or to a nitrogen gas line. The spinning nozzle may be operated at a temperature of ≥about 150° C. to ≤about 220° C. (for example, at 150, 160, 170, 180, 190, 200, 210 or 220° C.)

or at a temperature of (spinning temperature−about 30)° C. to (spinning temperature+about 30)° C. (for example, at a temperature of (spinning temperature−30, −20, −10, +0, +10, +20, +25 or +30° C.).

After stabilization of the spinning solution, the spinning solution is required to be pushed by the metering pump at a constant flow rate or pressurized to a constant pressure by opening the nitrogen gas valve. Generally, a discharge rate may be determined by the metering pump and may be regulated depending upon properties or characteristics of the hollow fiber membrane to be manufactured, and may be in the range of, for example, ≥about 1 g/sec or min to ≤about 50 g/sec or min (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 g/sec or min).

The spinning solution is discharged to the wet-type coagulation bath through the spinning nozzle. A preliminary hollow fiber membrane, which is not drawn, may be formed by spinning the spinning solution to the wet-type coagulation bath.

The wet-type coagulation bath is filled with water. The wet-type coagulation bath or water in the wet-type coagulation bath may be maintained at a temperature of about ≥15° C. to ≤about 40° C. (for example, 15, 16, 17, 18, 19, 20, 21, 22, 23, 24, 25, 26, 27, 28, 29, 30, 31, 32, 33, 34, 35, 36, 37, 38, 39 or 40° C.). In the coagulation bath, the spinning solution may be subjected to rapid cooling and crystallization. The size of crystals in the hollow fiber membrane may be controlled depending upon the temperature of the coagulation bath. A lower temperature of the coagulation bath provides a smaller crystal size of the polymer, whereby the hollow fiber membrane has a denser inner structure, which increases mechanical strength of the hollow fiber membrane. Conversely, a higher temperature of the coagulation bath provides a larger crystal size of the polymer, whereby the hollow fiber membrane has a coarser inner structure, which increases water permeability of the hollow fiber membrane, instead of a dense inner structure.

Upon cooling the spinning solution in the coagulation bath, thermally induced phase transition occurs in a state that crystal growth is suppressed by the non-crystalline polymer additive, and fine crystals and a non-crystalline region are formed on the outer surface of the hollow fiber membrane. In addition, the non-crystalline polymer additive is placed around the fine crystals, whereby division between the crystals and the non-crystalline region occurs. Pores of the membrane are formed by cleaving the non-crystalline region. In this way, as the amount of the non-crystalline polymer additive increases in the composition, the crystal size decreases, and the crystals and the non-crystalline region are divided from each other to have fine sizes, thereby enabling reduction in pore size on the outer surface and densification of the inner structure (interconnected structure). In addition, the structure of the hollow fiber membrane is changed from a dense structure of the outer surface thereof to a coarse structure of the inner surface thereof. That is, since an outer layer of the spinning solution (hollow fiber membrane) discharged through the spinning nozzle is exposed to an atmosphere or is brought into contact with water in the coagulation bath prior to an inner surface thereof, the outer surface of the hollow fiber membrane has a denser structure than the inner surface thereof. A main cause for contamination of the hollow fiber membrane in a microfiltration process is pore blockage, which becomes severer with increasing pore size on the outer surface. As the pore size of the outer surface decreases, the hollow fiber membrane has further improved anti-fouling properties.

A distance between the spinning nozzle and a surface of water in the wet-type coagulation bath may be in the range of ≥about 0.5 cm to ≤about 50 cm (for example, 0.5 cm, 0.7 cm, 1 cm, 1.5 cm, 2 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, 10 cm, 10.5 cm, 11 cm, 11.5 cm, 12 cm, 12.5 cm, 13 cm, 13.5 cm, 14 cm, 14.5 cm, 15 cm, 16 cm, 17 cm, 18 cm, 19 cm, 20 cm, 25 cm, 30 cm, 35 cm, 40 cm, 45 cm, or 50 cm), preferably ≥about 1 cm to ≤about 15 cm. The distance between the spinning nozzle and the surface of water in the wet-type coagulation bath may correspond to a distance gap) along which the spinning solution is exposed to external air. An exposure time of the polymer solution to an atmosphere can be controlled through adjustment of the length of the air gap. As the length of the air gap increases, the exposure time of the polymer solution to the atmosphere increases upon discharge of the polymer solution through the spinning nozzle. During exposure of the polymer solution to the atmosphere, a solvent is evaporated from an outermost layer of the polymer solution, thereby providing a dense structure to the outer surface of the solidified (crystallized) hollow fiber membrane. As a result, a dense layer is formed on the outer surface of the hollow fiber membrane, thereby increasing mechanical strength of the hollow fiber membrane while reducing water permeability thereof. Conversely, as the length of the air gap decreases, the exposure time of the polymer solution to the atmosphere decreases upon discharge of the polymer solution through the spinning nozzle, thereby retarding formation of the dense layer on the outer surface of the hollow fiber membrane. As a result, a small dense layer is formed on the outer surface of the hollow fiber membrane, thereby reducing mechanical strength of the hollow fiber membrane while increasing water permeability thereof.

The preliminary hollow fiber membrane is removed from the coagulation bath and wound around a bobbin. The preliminary hollow fiber membrane wound around the bobbin is dipped in an extraction solvent. The extraction solvent refers to a solvent capable of dissolving the polyester plasticizer, the good solvent, and the non-crystalline polymer additive in the hollow fiber membrane excluding the PVDF resin therein. According to the present invention, the extraction solvent may be dichloromethane, ethanol, or water. By dipping the preliminary hollow fiber membrane in the extraction solvent, the plasticizer and the additive are escaped from the hollow fiber membrane to form pores in the hollow fiber membrane, thereby forming a porous preliminary hollow fiber membrane.

In some embodiments, the extraction solvent may include at least one selected from the group of dichloromethane, ethyl alcohol and isopropyl alcohol.

Thereafter, the preliminary hollow fiber membrane may be subjected to crystallization. In some embodiments, after extraction of the plasticizer and the additive, the preliminary hollow fiber membrane is dried in an atmosphere. As a result, the extraction solvent is rapidly volatilized from the preliminary hollow fiber membrane exposed to an atmosphere, thereby allowing residual crystallization and contraction of the preliminary hollow fiber membrane. Through this process, the outer diameter and the length of the hollow fiber membrane are contracted by 10% to 30%. The contracted hollow fiber membrane is subjected to heat treatment to achieve complete crystallization. Here, heat treatment is preferably performed at a temperature of ≥about 80° C. to ≤about 150° C. (for example, 80, 90, 100, 110, 120, 130, 140 or 150° C.) for 3 minutes to about 200 minutes (for example, 3, 4, 5, 6, 7, 8, 9, 10, 11, 12, 13, 14, 15, 17, 20, 25, 30, 40, 50, 60, 70, 100, 150 or 200 minutes), specifically at a temperature of ≥about 100° C. to ≤about 150° C. for ≥about 3 minutes to ≤about 10 minutes.

After completion of crystallization, the hollow fiber membrane is subjected to drawing to cleave the pores in the hollow fiber membrane. Here, cold drawing is performed. Cold drawing can maximize division of a crystalline region and a non-crystalline region and cleavage of the non-crystalline region, as compared with hot drawing. Cold drawing is performed at room temperature (at about 10° C. to about 30° C.) in a short zone. In cold drawing, a short drawing distance is preferred since it allows uniform drawing by securing drawing points while suppressing generation of uneven drawing. According to this embodiment, the drawing zone may have a distance of ≥about 50 mm to ≤about 200 mm (for example, 50, 60, 70, 80, 90, 100, 110, 120, 130, 140, 150, 160, 170, 180, 190 or 200 mm). Drawing may be performed to an elongation of about 2.5 times at room temperature (25° C.).

The hollow fiber membrane can have a porous inner structure by increasing crystal structure alignment and cleaving the non-crystalline portion through the drawing process. Since the outer surface of the hollow fiber membrane has a small crystal size, the crystals and the non-crystal portion are divided from each other to have fine sizes, thereby forming fine pores on the outer surface of the hollow fiber membrane through pore cleavage in the fine non-crystalline portion upon drawing. On the other hand, since the crystals and the non-crystal portion on the inner surface of the hollow fiber membrane are divided from each other to have coarser sizes than on the outer surface thereof, large pores are formed on the inner surface of the hollow fiber membrane through pore cleavage in the non-crystalline portion between the crystals (lamella stack) upon drawing. Such a structure is referred to as the zebra stripe pattern in which the dense portion and the porous portion are alternately arranged. As a result, the hollow fiber membrane has improved mechanical strength and water permeability through structural densification and formation of the fine pores and the porous structure.

After drawing, the hollow fiber membrane is subjected to heat treatment again to suppress contraction of the hollow fiber membrane.

As such, according to the present invention, a hollow fiber membrane having a network structure can be manufactured by inducing liquid-liquid phase transition using the plasticizer through thermally induced phase transition. In particular, a hydrophilic non-crystalline polymer allows densification (reduction in crystal size and pore size) of the outer surface of the hollow fiber membrane and formation of an interconnected inner structure.

MODE FOR INVENTION

Next, the present invention will be described in more detail with reference to some examples. It should be understood that these examples are provided for illustration only and are not to be in any way construed as limiting the invention.

Descriptions of details apparent to those skilled in the art will be omitted for clarity.

EXAMPLE

Example 1

A uniform polymer spinning solution was prepared by mixing 100 parts by weight of PVDF, 1.86 parts by weight of an adipic acid polyester plasticizer, 0.36 parts by weight of a good solvent (NMP), and 0.1 parts by weight of a non-crystalline polymer additive (poly(vinyl pyrrolidone) (PVP)) while heating and stirring under conditions of 210° C. and 1 bar for 3 hours. Then, an adipic acid polyester plasticizer was discharged as an interior coagulant through an inner pipe of a dual-pipe type spinning nozzle and the polymer spinning solution was discharged through an outer pipe thereof. Here, the spinning solution having a temperature of 210° C. was discharged to a coagulation bath through the spinning nozzle having a temperature of 170° C. A distance between the spinning nozzle and the coagulation bath was 5 cm. The spinning solution discharged through the spinning nozzle was solidified into a hollow fiber membrane in the coagulation bath having a temperature of 25° C. Then, the solidified hollow fiber membrane was transferred from the coagulation bath to a washing bath to wash the hollow fiber membrane, which in turn was wound by a winding machine. The wound hollow fiber membrane was dipped in dichloromethane such that the adipic acid polyester plasticizer, the good solvent (NMP), and the hydrophilic non-crystalline polymer (PVP) could be extracted therefrom. After the extraction process, the hollow fiber membrane was dried at room temperature and subjected to heat treatment at 120° C. to induce crystallization of the hollow fiber membrane. By crystallization, the length and outer diameter of the hollow fiber membrane were reduced by 20%. After drying and heat treatment, the hollow fiber membrane was subjected to cold drawing to an elongation of 2.5 times and was subjected to heat treatment again at 100° C., followed by winding, thereby preparing a final hollow fiber membrane. FIG. 3A is an SEM image (magnification: 5,000×) of an outer surface of the prepared hollow fiber membrane and FIG. 3B is an SEM image (magnification: 5,000×) of an inner surface thereof.

Example 2

A hollow fiber membrane was prepared in the same manner as in Example 1 except that 1.93 parts by weight of the adipic acid polyester plasticizer, 0.36 parts by weight of NMP, and 0.03 parts by weight of PVP were mixed with 100 parts by weight of PVDF.

Example 3

A hollow fiber membrane was prepared in the same manner as in Example 1 except that 1.8 parts by weight of the adipic acid polyester plasticizer, 0.36 parts by weight of NMP, and 0.16 parts by weight of PVP were mixed with 100 parts by weight of PVDF.

Example 4

A hollow fiber membrane was prepared in the same manner as in Example 1 except that 1.86 parts by weight of the adipic acid polyester plasticizer, 0.36 parts by weight of NMP, and 0.1 parts by weight of PMMA as the non-crystalline polymer additive were mixed with 100 parts by weight of PVDF.

Comparative Example 1

A hollow fiber membrane was prepared in the same manner as in Example 1 except that 1.96 parts by weight of the adipic acid polyester plasticizer and 0.36 parts by weight of NMP were mixed with 100 parts by weight of PVDF. FIG.

4A is an SEM image (magnification: 5,000×) of an outer surface of the prepared hollow fiber membrane and FIG. 4B is an SEM image (magnification: 5,000×) of an inner surface thereof.

Comparative Example 2

A hollow fiber membrane was prepared in the same manner as in Example 1 except that 1.96 parts by weight of the adipic acid polyester plasticizer and 0.36 parts by weight of NMP were mixed with 100 parts by weight of PVDF and the temperature of the coagulation bath was set to 5° C.

Property Evaluation

1) Breaking strength (kgf/fiber): Breaking strength was measured at 23° C. and at 50% RH (relative humidity) under conditions of a hollow fiber membrane length of 100 mm and a cross head speed of 50 mm/min using a fiber tensile tester (Instron). A maximum tensile load (Wmax) was measured by stretching a hollow fiber membrane specimen until the specimen was broken.

2) Elongation at break (%): A ratio of an extended length of a hollow fiber membrane specimen to an initial length thereof was measured by stretching the hollow fiber membrane specimen gripped by a gripper at a rate of 50 mm/min until just before breakage of the hollow fiber membrane specimen occurs.

3) Water permeability (LMH): A hollow fiber membrane was placed in a 200 mm acrylic tube and potted with an epoxy resin, followed by measurement of a net permeate flow rate per hour, thereby determining water permeability per unit membrane area. Here, the net water permeability was measured by dead-end filtration method through application of a pressure of 1 bar.

4) Average pore diameter (μm): An average pore diameter of a hollow fiber membrane was measured by sequentially measuring a wet curve and a dry curve while increasing a gas (air, $N_2$) flow pressure using a capillary flow porometer. In measurement of the wet curve, Porefil (surface tension of 16 dyn/cm) was used as a wetting fluid.

5) Outer surface maximum pore size (μm): The maximum pore size of a hollow fiber membrane was measured using Image-pro program based on an SEM image (magnification: 5,000×) of an outer surface of the hollow fiber membrane.

6) Bubble point (bar): As in measurement of water permeability, a PVDF hollow fiber membrane was placed in a 200 mm acrylic tube and potted with an epoxy resin to prepare a small module. With the prepared small module dipped in water, an air pressure in the module was gradually increased from 0 bar until air bubbles were found on the surface of the membrane. A pressure at which the air bubbles were found on the surface of the membrane was measured as a bubble point.

TABLE 1

|  | Example | | | | Comparative Example | |
| --- | --- | --- | --- | --- | --- | --- |
|  | 1 | 2 | 3 | 4 | 1 | 2 |
| PVDF | 100 | 100 | 100 | 100 | 100 | 100 |
| Plasticizer | 1.86 | 1.93 | 1.80 | 1.86 | 1.96 | 1.96 |
| Good solvent | 0.36 | 0.36 | 0.36 | 0.36 | 0.36 | 0.36 |
| PVP | 0.10 | 0.03 | 0.16 | — | — | — |
| PMMA | — | — | — | 0.10 | — | — |
| Coagulation bath temperature (° C.) | 25 | 25 | 25 | 25 | 25 | 5 |
| Breaking strength (kgf/fiber) | 1.5 | 1.3 | 1.3 | 1.5 | 1.1 | 1.4 |
| Elongation at break (%) | 80 | 77 | 81 | 82 | 110 | 207 |
| Water permeability (LMH/bar) | 3200 | 2480 | 2100 | 1540 | 785 | 445 |
| Average pore diameter (μm) | 0.09 | 0.12 | 0.08 | 0.09 | 0.15 | 0.11 |
| Outer surface maximum pore size (μm) | 0.11 | 0.21 | 0.09 | 0.12 | 1.01 | 0.32 |
| Bubble point (bar) | >4 | >4 | >4 | >4 | >4 | >4 |

As shown in Table 1, it could be seen that the hollow fiber membranes of Examples 1 to 4 having a stripe pattern including a dense portion and a porous portion alternately arranged on an inner surface thereof had good water permeability and mechanical strength, and the hollow fiber membranes of Comparative Examples 1 and 2 had significantly poor water permeability.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention. Therefore, the scope of the invention should be limited only by the appended claims and equivalents thereto.

The invention claimed is:

1. A hollow fiber membrane having an outer surface and an inner surface, wherein the inner surface has a zebra stripe pattern having a dense portion and a porous portion alternately formed in a longitudinal direction thereof and the outer surface has a maximum pore size of about 1 μm or less, and wherein the hollow fiber membrane has a water permeability (flux) of about 1,300 LMH/bar to about 5,000 LMH/bar.

2. The hollow fiber membrane according to claim 1, wherein the hollow fiber membrane has an average pore diameter of about 0.08 μm to about 0.3 μm and the outer surface of the hollow fiber membrane has a maximum pore size of about 0.09 μm to about 0.5 μm.

3. The hollow fiber membrane according to claim 1, wherein, the dense portion of the inner surface has an average pore diameter of about 0.001 μm to about 0.05 μm and the porous portion of the inner surface has an average pore diameter of about 0.1 μm to about 0.55 μm.

4. The hollow fiber membrane according to claim 1, wherein, in an area of about 5 μm² on the inner surface of the hollow fiber membrane, the dense portion has a maximum pore size of less than about 0.08 μm and the porous portion has at least one pore having a pore diameter of about 0.1 μm or more.

5. The hollow fiber membrane according to claim 1, wherein the dense portion and the porous portion are formed in an apparent area ratio represented by Equation 1:

about 0.25≤apparent area ratio($B/A$)≤about 2.5, where B indicates an apparent area of the porous portion and A indicates an apparent area of the dense portion.

6. The hollow fiber membrane according to claim 1, wherein a pore size of the hollow fiber membrane gradually increases from the outer surface thereof to the inner surface thereof.

7. The hollow fiber membrane according to claim 1, wherein the hollow fiber membrane has an elongation at break of about 70% to about 210%.

8. The hollow fiber membrane according to claim 1, wherein the hollow fiber membrane has a network structure.

9. A method of manufacturing a hollow fiber membrane, comprising:
    preparing a spinning solution by using a composition comprising a polyvinylidene fluoride resin, a polyester plasticizer having a viscosity of about 100 cP to about 4,000 cP, a good solvent, and a non-crystalline polymer additive;
    spinning the spinning solution to a wet-type coagulation bath to form a preliminary hollow fiber membrane;
    extracting the plasticizer, the good solvent and the non-crystalline polymer additive from the preliminary hollow fiber membrane;
    crystallizing the preliminary hollow fiber membrane; and
    cold drawing the crystallized preliminary hollow fiber membrane.

10. The method according to claim 9, wherein the non-crystalline polymer additive is a hydrophilic non-crystalline polymer additive and has a solubility parameter difference of about 5 MPa$^{0.5}$ or less with the polyvinylidene fluoride resin.

11. The method according to claim 9, wherein the non-crystalline polymer additive is a hydrophobic non-crystalline polymer additive and has a solubility parameter difference of about 20 MPa$^{0.5}$ or less with the polyvinylidene fluoride resin.

12. The method according to claim 9, wherein the wet-type coagulation bath has a temperature in the range of about 15° C. to about 40° C.

13. The method according to claim 9, wherein crystallizing comprises heat treatment at a temperature of about 80° C. to about 150° C. for about 3 minutes to about 200 minutes.

14. The method according to claim 9, wherein the composition comprises 100 parts by weight of the polyvinylidene fluoride resin, about 1.5 parts by weight to about 2.0 parts by weight of the polyester plasticizer, about 0.2 parts by weight to about 0.5 parts by weight of the good solvent, and about 0.01 parts by weight to about 0.2 parts by weight of the non-crystalline polymer additive.

* * * * *